Feb. 2, 1932.  R. NIEHAGE  1,843,459
FEEDER
Filed Sept. 18, 1930
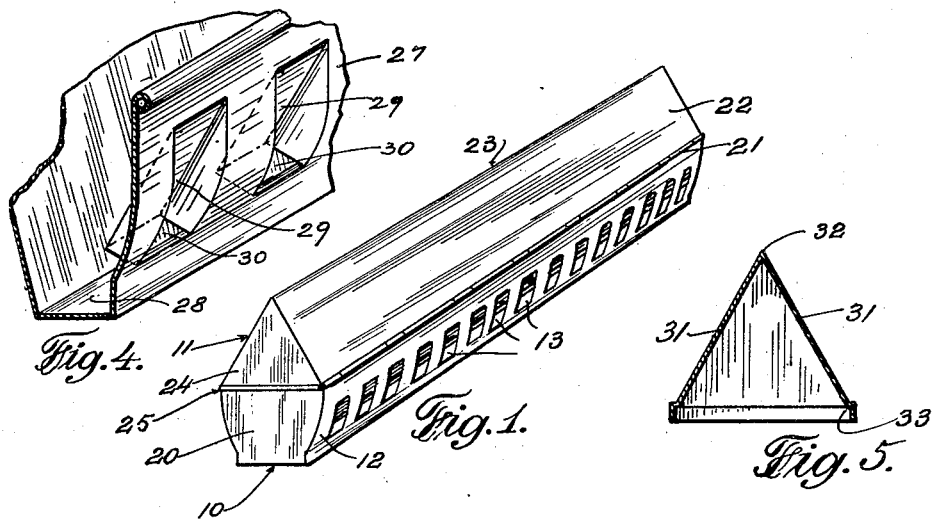
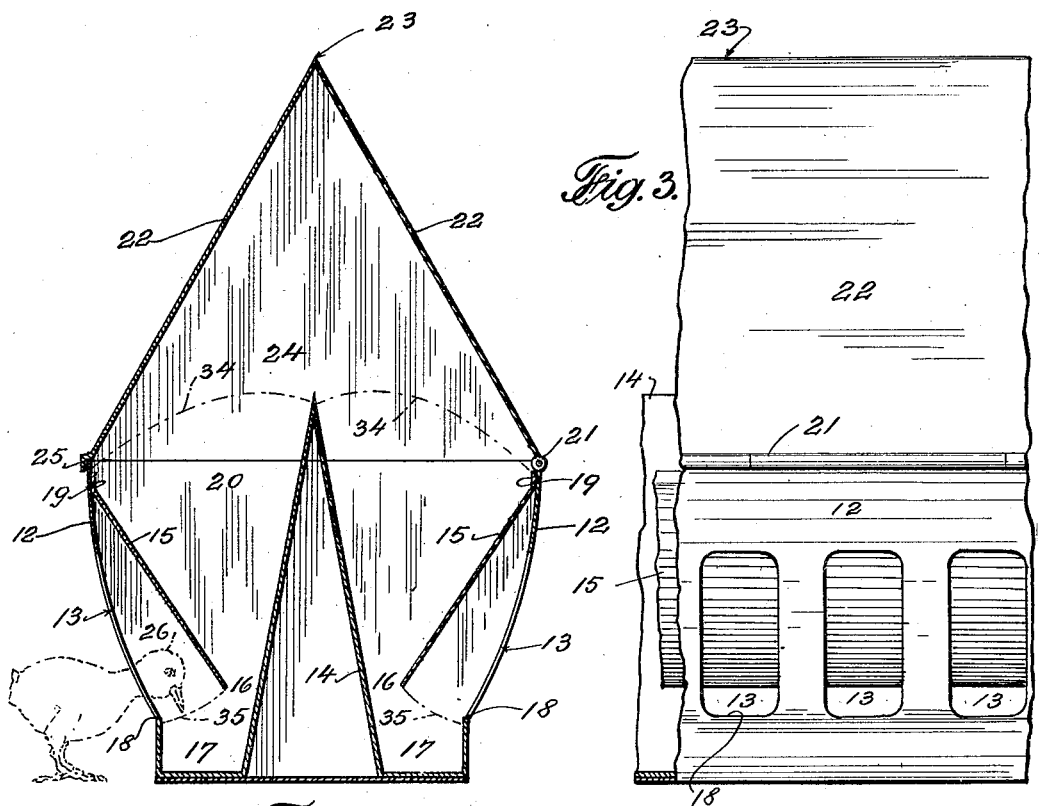
INVENTOR
Richard Niehage
BY
ATTORNEY Patented Feb. 2, 1932

1,843,459

UNITED STATES PATENT OFFICE

RICHARD NIEHAGE, OF NEW YORK, N. Y.

FEEDER

Application filed September 18, 1930. Serial No. 482,721.

This invention relates to poultry feeders in general, and particularly to what may be termed sanitary feeders.

One of the great drawbacks of poultry feeders used heretofore resides in the fact that they are unclean, due mostly to their construction, permitting the young fowl to perch upon the device, soil it and dirty the feed, which is then eaten and causes constipation and even death of the fowl.

The prime object of my invention, therefore, is to provide a sanitary device for use as feeder or water retainer so constructed as to preclude the possibility of the fowl resting, setting or walking over any part thereof, and preventing the feed or water being soiled by the fowl's discharge.

Another object of my invention is to provide within such sanitary feeder device, means for retaining and gradually dispensing feed to the fowl as the grub is being consumed.

A further object of my invention is to construct such feeding device, as to render it not only practical for the purpose first indicated, but also inexpensive and easily operable by the owners of poultry and their help.

The foregoing and still further objects will become more fully apparent from the following description and the accompanying drawings, forming part of my disclosure, but by no means intended to limit my invention to the structure actually illustrated, and in which Fig. 1 is a perspective view of a preferred form of my device, Fig. 2 is a typical transverse cross sectional view therethrough, Fig. 3 is a partial side elevation thereof, Fig. 4 illustrates a fragmental perspective view of a modified form of my feeder, and Fig. 5 illustrates a cross sectional view through a modified feeder top.

Referring now more specifically to the drawings, numeral 10 denotes the lower or body portion of my feeder with which is associated a closure 11. The feeder body is hollow and consists of a longitudinal structure composed of outwardly bulging side members 12 which widen from the bottom towards the top of the structure.

In the side members is provided a plurality of apertures 13, the number of which depends upon the length of the body. At the center of the device a longitudinal partition 14 is arranged which divides the body into two compartments in which are disposed chutes 15 adapted to partially cover apertures 13.

Partition 14 and chutes 15 form hoppers for retaining and dispensing grub for fowl, which feed issues through the narrow passages 16, between partition 14 and chutes 15, into troughs 17 disposed below the lower edges 18 of openings 13. Chutes 15 are shown attached in Fig. 2 at 19 to the inner faces of sides 12, however, their point of attachment may be changed and they may be secured to the end walls 20 of the body, if preferred, and may be spaced from sides 12 to facilitate cleaning of the device. For the same purpose these chutes may be made removable. Such modified constructions are not shown in the drawings since they are quite obvious.

Secured at 21 by means of a hinge connection, closure or cover 11 consists of two steeply arranged side members 22, joined at their top to a sharp ridge 23, and end members 24. The lower edge of the closure is preferably provided with an overlap 25. The entire structure of the closure is so constructed as to avoid the formation of any resting place where a fowl may either perch or even temporarily alight, thereby preventing soiling of the device and its contents.

Chutes 15 serve not only for retaining feed but, due to their arrangement relative to apertures 13, limit the depth of entry of a fowl's head through the openings and preclude even the smallest fowl from using edges 18 of the apertures as a resting place. The upwardly widening sides 12 also prevent fowl from gathering near the device in any other way except by facing the feed apertures 13, which are so designed as to permit individual entry of the head of only one fowl, as illustrated in broken lines at 26.

The arrangement of apertures 13 and chutes 15 may be altered, as indicated in Fig. 4, in which a portion of a modified feeder body is illustrated. In this figure, numeral 27 denotes the side of the feeder device which widens from the through portion 28 upwards. Pressed from the side member 27 inwards are shields 29, forming individual limiting means for each feeder opening 30. In this modified arrangement the fowl's head or beak cannot reach behind the side portion between two adjacent openings as is possible in an artrangement such as shown in Figs. 2 and 3.

Fig. 5 illustrates a modified design of the closure, comprising again steeply arranged side members 31, joined at 32 to a sharp edge. The lower end of this construction is provided with a recess 33 adapted to rest upon the upper edge of the feeder body. This type of cover is entirely removable from the feeder body and is illustrated for the purpose of showing that the closure construction may be modified in various ways, and may be even in sliding engagement with the feeder body (not shown).

Since it is essential that my device is built inexpensively so as to become available for general use, I prefer using sheet metal or water-proofed paper, fibre, or other material. I have found it expedient, however, to employ cardboard impregnated with what is known as "wasser-glass", for constructing my device, which will answer the purpose admirably, due to its toughness and water resisting qualities.

In Fig. 2 I have indicated by broken lines 34 the top of the grub in the hoppers while numeral 35 indicates the top line of the feed in troughs 17. It is obvious, however, that the feeder may be used also as a fountain for either liquid feed or water.

The foregoing description deals with specific structures of my device of which the main feature, however, resides in the arrangement of the feeder so designed as to preclude soiling of the feed by fowl, in that the latter is prevented from alighting on any part thereof. It is obvious therefore, that my device is capable of numerous modifications and changes within the broad scope of my idea, and I therefore reserve for myself the right to make such changes or modifications, without departing from my main feature and purpose of my invention stated above.

I claim:

1. A sanitary poultry feeder, comprising a hollow body and a cover, the former having sides diverging outwards from the bottom to the top, said cover having steep sides terminating in a sharp top edge and feed openings provided in said outwardly diverting sides.

2. A sanitary poultry feeder, comprising a hollow body and a cover for the latter, said body having sides diverging outwards from the bottom towards the top and provided with a plurality of side openings just large enough for accommodating the head of a fowl, said cover adapted to close the top of the body and comprising two steep sides terminating in a sharp top edge.

3. A sanitary poultry feeder, comprising a hollow body and a hollow closure, said body having outwardly bulging sides narrow at the bottom and widening towards the top, said sides provided with a plurality of apertures for accommodating individually the heads of fowl, chute members disposed within the body and so disposed as to partially cover said apertures, thereby limiting the depth of entry of the heads of fowl, a central partition dividing the body into two compartments and forming, together with the chute members, feed dispensing hoppers, said hollow closure comprising two steeply arranged sides terminating in a sharp top edge and end members, the closure structure adapted to completely cover said body and to preclude fowl from using it as a rest or perch.

4. A poultry feeder, comprising in combination, a hollow body having hoppers arranged within and provided with diverging sides widening from bottom to top, apertures arranged in said sides for individually accommodating the heads of fowl, a plurality of chutes forming parts of said hoppers and partially covering said apertures, thereby limiting the depth of entry of the fowls' heads, troughs arranged below said chutes and accessible through said apertures and adapted to hold solid or liquid food, a closure associated with said body and composed of steep sides and vertical ends, a sharp edge formed between the top edges of said steep sides for preventing fowl from perching thereon.

5. A poultry feeder, comprising a hollow body and an operative closure secured thereto, said body having perforated, upwardly diverging sides and means within for limiting the depth of entry through the perforations.

In testimony whereof I affix my signature.

RICHARD NIEHAGE.